(12) United States Patent
Iino et al.

(10) Patent No.: US 6,648,320 B2
(45) Date of Patent: Nov. 18, 2003

(54) DOCUMENT FEEDER AND IMAGE READING APPARATUS

(75) Inventors: Makoto Iino, Kofu (JP); Yasuhito Watanabe, Yamanashi-ken (JP); Ichitaro Kubota, Kofu (JP); Atuyuki Hirose, Yamanashi-ken (JP)

(73) Assignee: Nisca Corporation, Yamanashi-ken (JP)

( * ) Notice: Subject to any disclaimer, the term of this patent is extended or adjusted under 35 U.S.C. 154(b) by 0 days.

(21) Appl. No.: 10/162,718

(22) Filed: Jun. 6, 2002

(65) Prior Publication Data

US 2003/0006544 A1 Jan. 9, 2003

(30) Foreign Application Priority Data

Jun. 18, 2001 (JP) ........................................ 2001-184149

(51) Int. Cl.[7] .............................................. B65H 85/00
(52) U.S. Cl. ..................... 271/3.15; 271/3.17; 271/301; 271/186
(58) Field of Search ............................... 271/3.15, 3.17, 271/301, 186

(56) References Cited

U.S. PATENT DOCUMENTS

| | | | | |
|---|---|---|---|---|
| 4,713,674 A | * | 12/1987 | Giezeman et al. | 399/390 |
| 5,031,003 A | * | 7/1991 | Hamano | 399/367 |
| 5,116,035 A | * | 5/1992 | Russel et al. | 271/3.13 |
| 5,181,705 A | * | 1/1993 | Ueda et al. | 271/3.15 |
| 5,887,865 A | * | 3/1999 | Ishimaru | 271/4.1 |
| 5,930,577 A | * | 7/1999 | Forsthoefel et al. | 399/401 |
| RE36,697 E | * | 5/2000 | Tsukamoto | 399/45 |
| 6,145,834 A | * | 11/2000 | Hirota et al. | 271/225 |
| 6,185,380 B1 | * | 2/2001 | Abe et al. | 399/18 |
| 6,354,589 B1 | * | 3/2002 | Taruki et al. | 271/265.01 |
| 6,393,251 B2 | * | 5/2002 | Kono | 399/370 |

OTHER PUBLICATIONS

Patent Abstracts of Japan, Publication No. 07175279 A, Published on Jul. 14, 1995, Applicant: Xerox Corp.
Patent Abstracts of Japan, Publication No. 10081449 A, Published on Mar. 31, 1998, Applicant: Nisca Corp. & Konica Corp.

* cited by examiner

Primary Examiner—Donald P. Walsh
Assistant Examiner—Matthew J. Kohner
(74) Attorney, Agent, or Firm—Kanesaka & Takeuchi

(57) ABSTRACT

A document feeder apparatus is provided with the first switchback path using a space between a supply tray and a discharge tray arranged to overlap with each other, and the second switchback path between the discharge tray and a pressing cover of a platen. According to a length of an original, a flapper is switched to a position to guide the original to one of the first switchback path and the second switchback path. Through this configuration, it is possible to transport a large size double-sided original. The apparatus can be made small, and productivity of the double-sided original is improved.

14 Claims, 12 Drawing Sheets

DOCUMENT FEEDER AND IMAGE READING APPARATUS

BACKGROUND OF THE INVENTION

This invention relates to an automatic document feeder in an image reading apparatus. More particularly, this invention relates to an original transport path for automatically feeding an original to an image reading position, for aligning pages of the originals that are read, and for discharging the originals.

In a conventional automatic document feeder used in an image reading apparatus such as a copier, a facsimile and an image scanner, it is well known that a device such as one disclosed in Japanese Patent Publication (Tokkai) No. 07-175279 can read both sides of an original.

In Japanese Patent Publication (Tokkai) No. 07-175279, it is described that the originals are fed from a sheet supply tray along an original supply path toward a reading portion facing a reading device on an image reading apparatus. After reading one side of the original by the reading device at the reading portion, the original is switched back via a switchback path that uses a space established between a sheet supply tray and a discharge tray, and is re-fed from the original supply path to the reading portion to read a back side of the original. Then, the original, whose front and back sides have been read, enters the switchback path again to switch back the front and back sides to change a page order for discharging, and is subsequently discharged to the discharge tray via the reading portion.

However, this automatic document feeder requires the original to pass through the reading portion three times to read both sides thereof, making the process of reading a two-sided document inefficient and taking a longer time to process such an original.

In order to solve the problems, in a system disclosed in Japanese Patent Publication (Tokkai) No. 10-81449, the original is fed from a sheet supply tray and is supplied along an original supply path formed of a large transport roller to an original reading portion facing a reading device on an image reading apparatus. After reading one side of the original by the reading device at the reading portion, the original is switched back via a switchback path formed below a discharge tray. While sending the original to the reading portion from the original supply path again, the backside of the original is read. Further, the original, whose front side and backside have been read, enters the switchback path to switch back the front and back sides to change a page order for discharging, and is subsequently discharged to the discharge tray. The front side and backside of the original are inverted in an inverting discharge path directly connected between the switchback path and the discharge outlet.

According to this automatic document feeder, because the path is formed to invert the original and change the page order of the originals without passing through the reading portion, the double-sided original needs to pass through the reading portion only twice upon reading. Therefore, it is possible for the next original to be supplied directly after reading the backside of the previous original, so the time for processing the original is shortened.

However, in such an apparatus, the switchback path needs to have a length long enough to accommodate the maximum length of the original in addition to a length of overrun for stopping and driving the original, so the apparatus tends to become large.

Furthermore, when advancing in the switchback path, only a trailing edge of the original is nipped in an advancement direction to be inverted. Therefore, a large-sized original with a deformed portion due to curling or being folded touches a guide in the switchback path when advancing, thereby making it difficult to transport such an original smoothly, resulting in a paper jam.

In view of the aforementioned problems, an object of the present invention is to provide an efficient and compact apparatus for securely transporting and feeding the original.

SUMMARY OF THE INVENTION

In order to attain the aforementioned object, this invention is provided with a plurality of switchback paths at downstream of a reading platen to turn over an original in the transport direction. A recognition device determines a length of the original guided toward the reading position. According to the length of the original, one of aforementioned switchback paths is selected, and the original is guided into the selected switchback path. Therefore, the original can be fed into an appropriate switchback path, in consideration of smooth original transport and efficient processing.

As another embodiment of the invention, an apparatus is provided with the first switchback path utilizing a space between a sheet supply tray and a storage tray arranged to overlap, and the second switchback path arranged between the storage tray and a platen. One of the first and second switchback paths is selected, and the original is guided therein. Thus, the apparatus cab be made compact, does not cause erroneous transport, improves the processing efficiency, and feeds the original to the appropriate switchback path.

DETAILED DESCRIPTION OF THE DRAWINGS

Figure 4A:
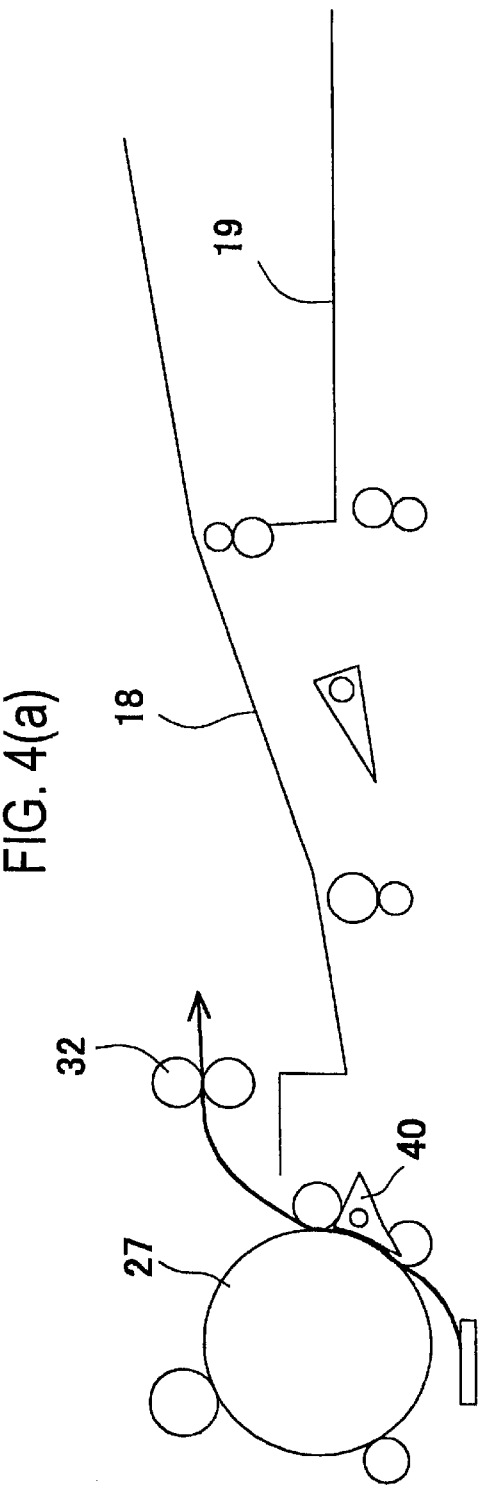
Figure 4B:
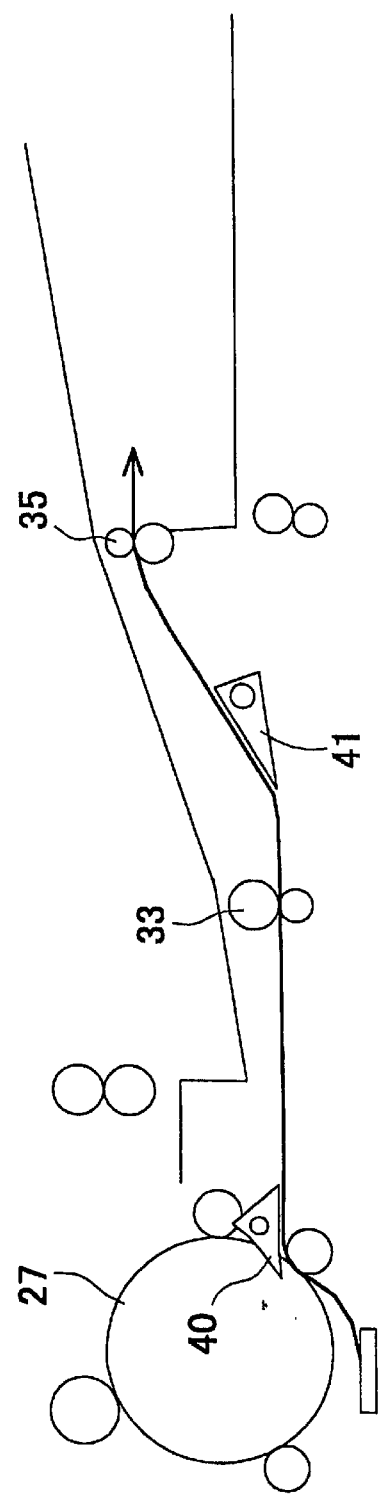
Figure 5:
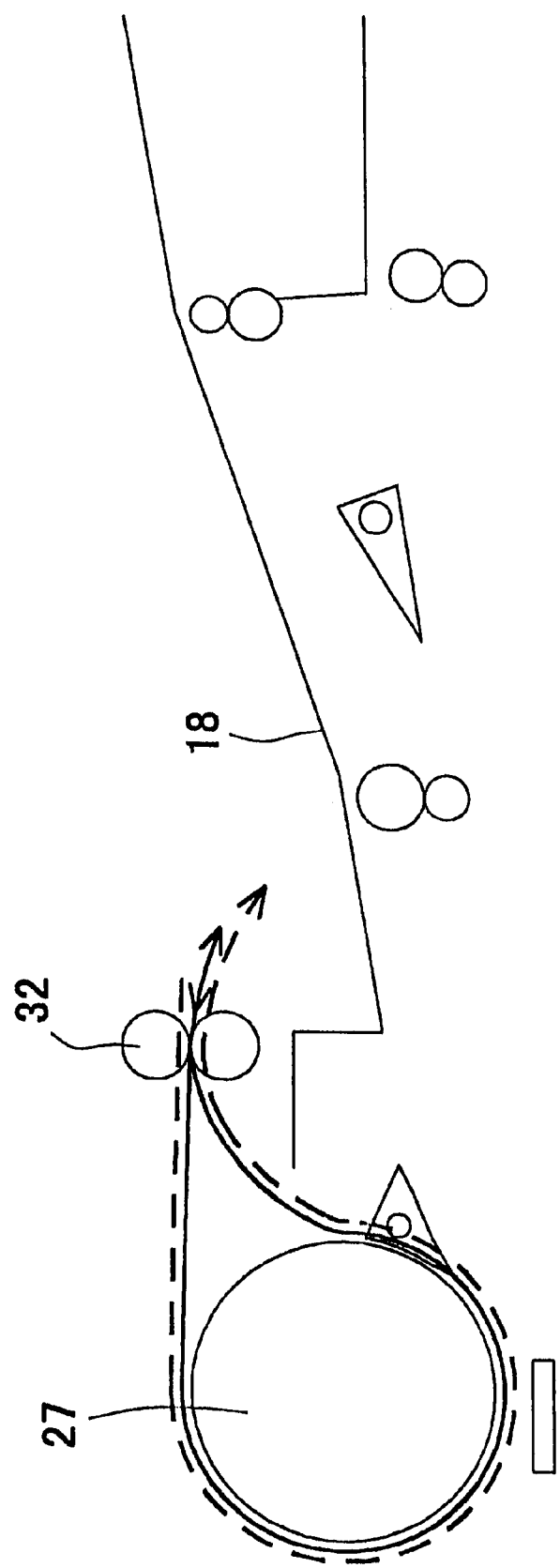
Figure 6:
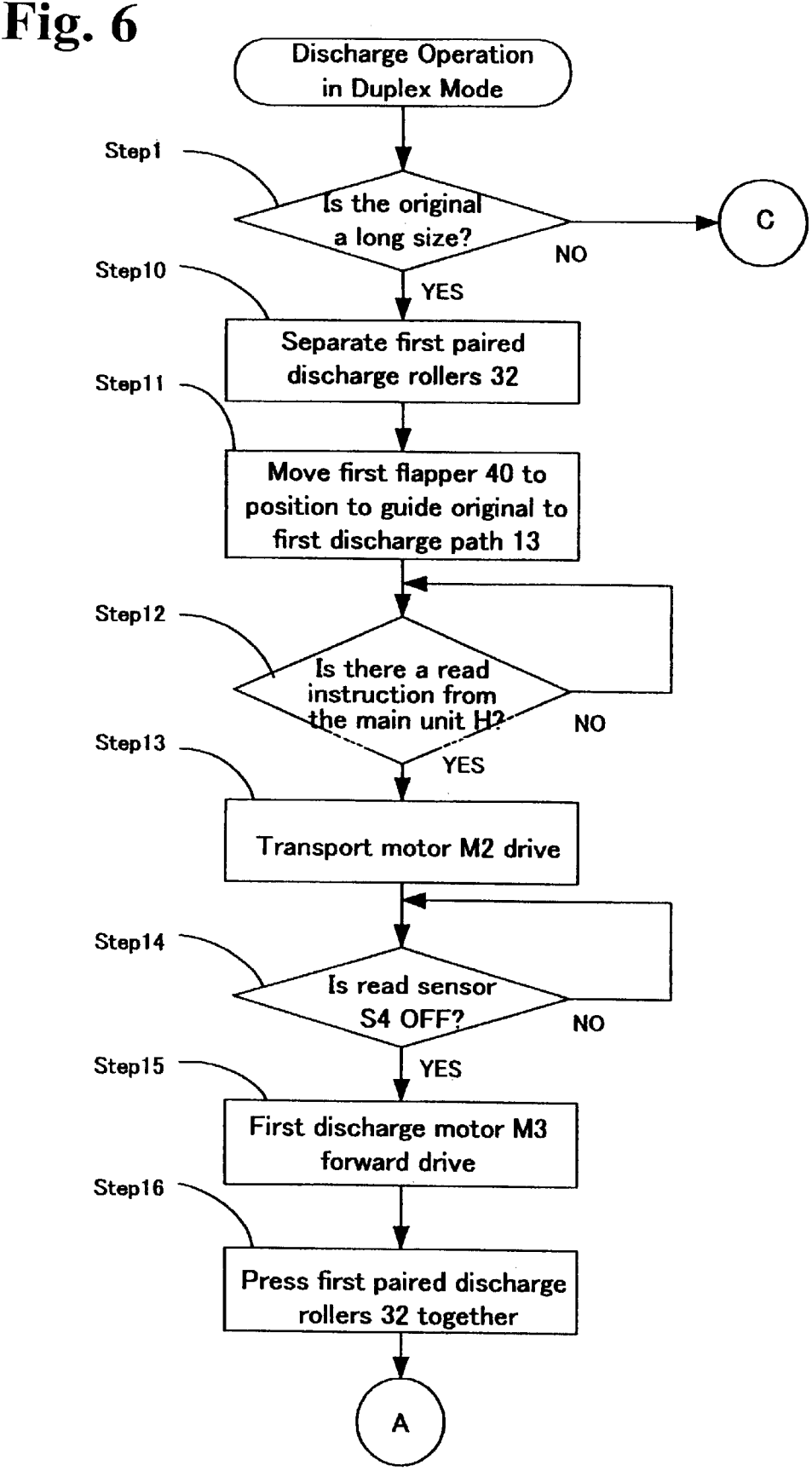
Figure 7:
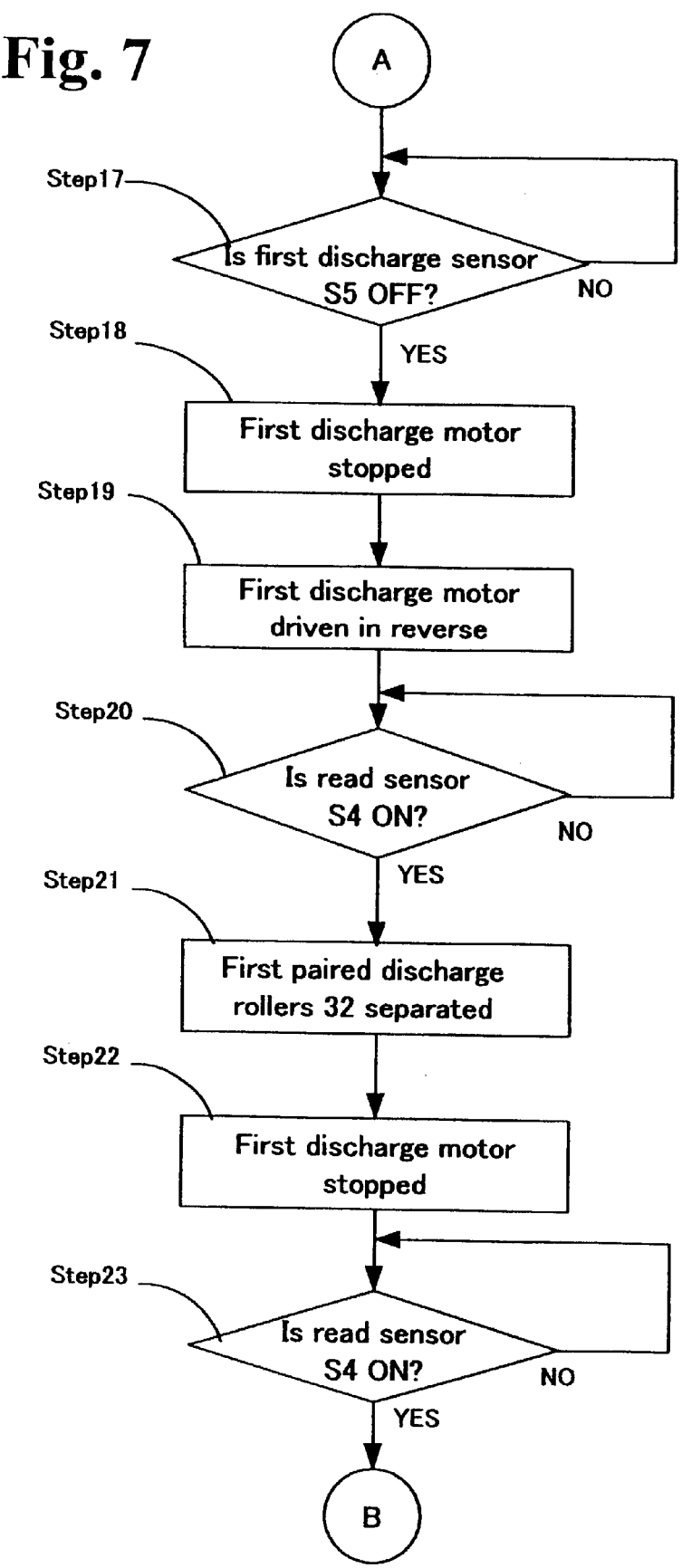
Figure 8:
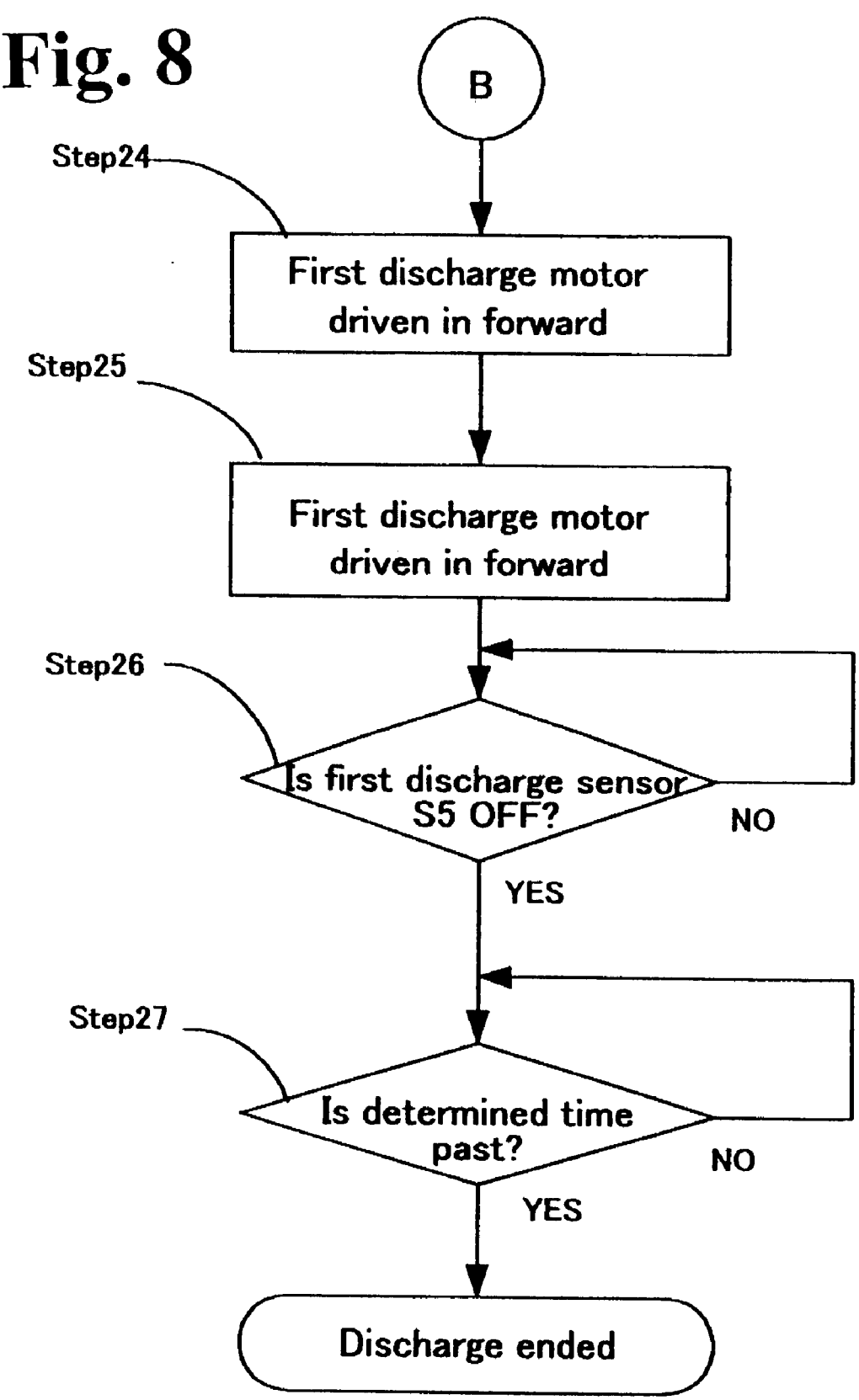
Figure 9:
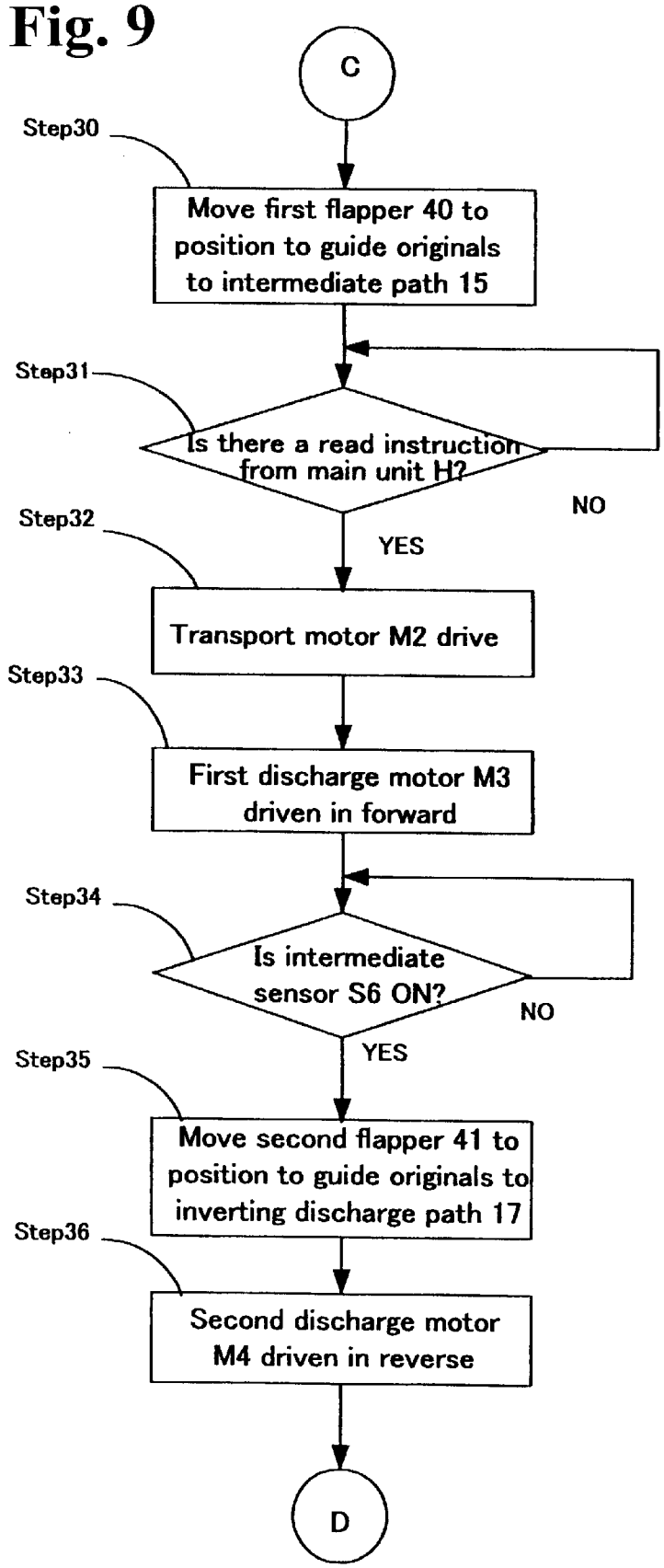
Figure 10:
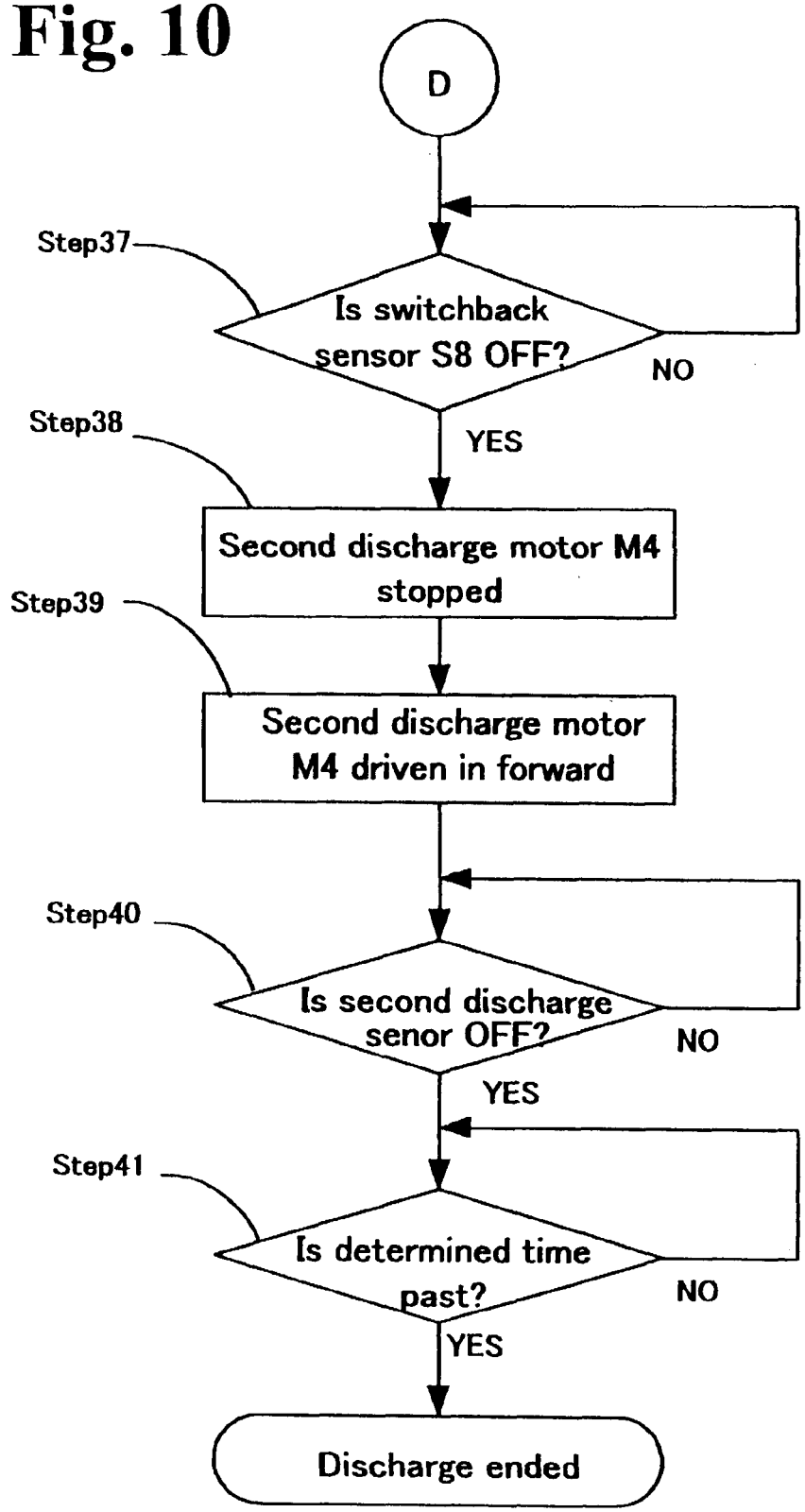
Figure 11:
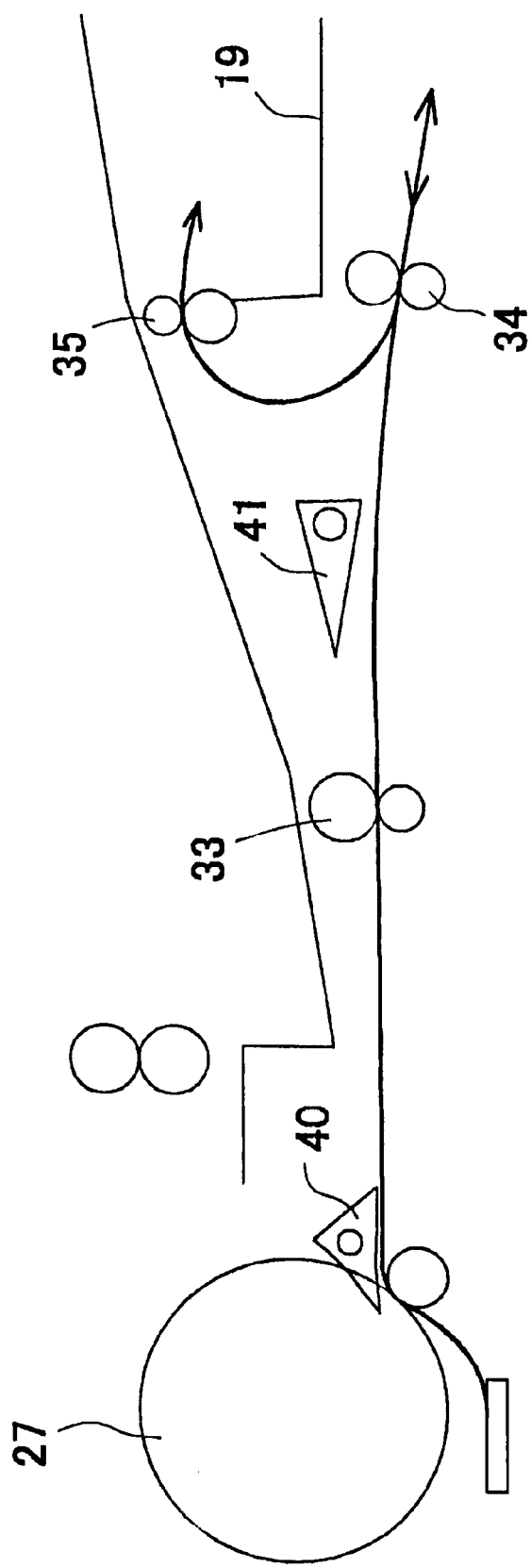
Figure 12:
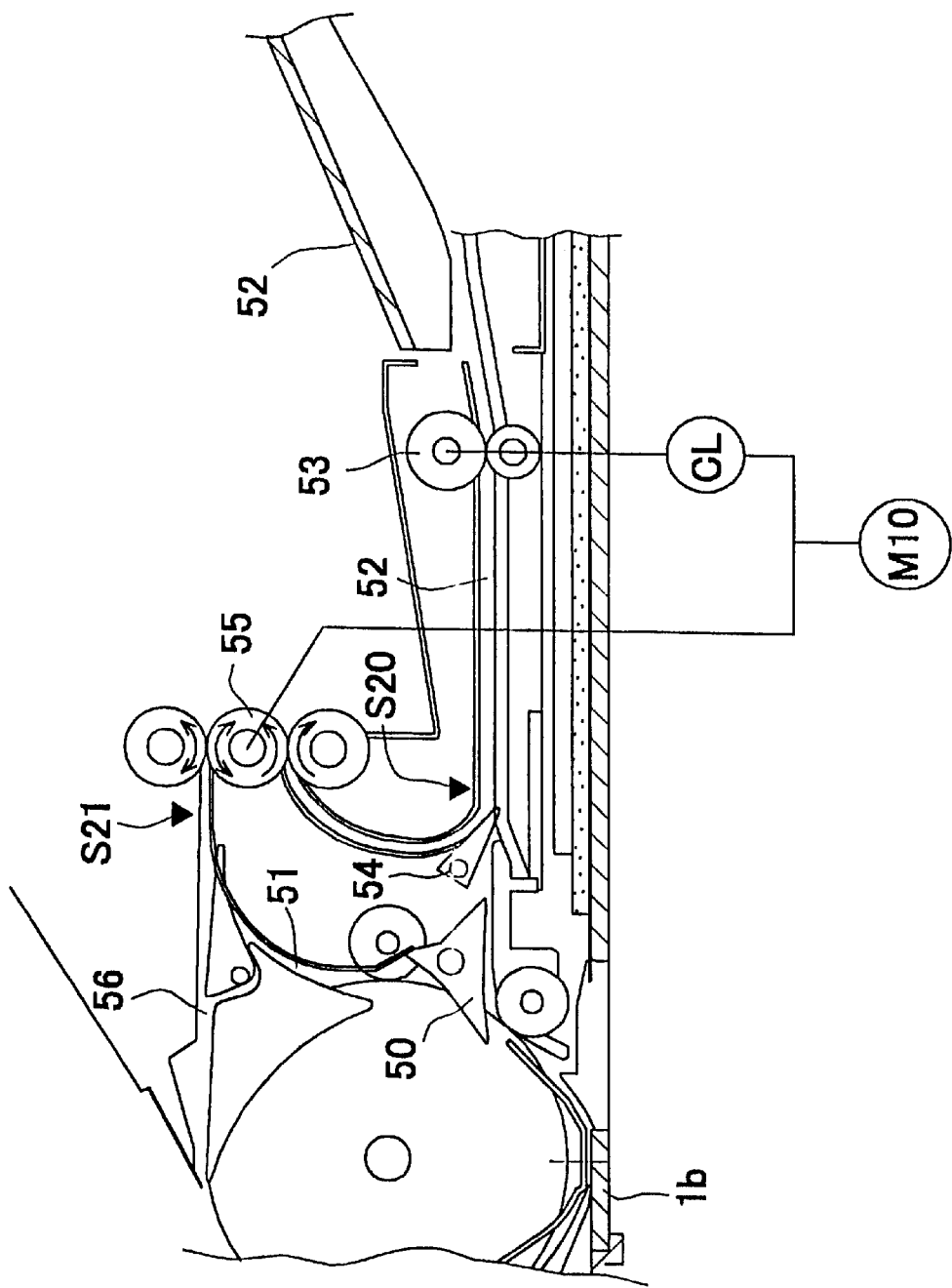

FIG. 4(a) and FIG. 4(b) are explanatory drawings showing an operation of an original in a single side mode of the document feeder apparatus according to the present invention;

FIG. 5 is an explanatory drawing showing an operation of a large size original in a duplex mode of the document feeder apparatus according to the present invention;

FIG. 6 is a flow chart showing a discharge operation in the duplex mode of the document feeder apparatus according to the present invention;

FIG. 7 is a flow chart showing the discharge operation in the duplex mode of the document feeder apparatus according to the present invention;

FIG. 8 is a flow chart showing the discharge operation in the duplex mode of the document feeder apparatus according to the present invention;

FIG. 9 is a flow chart showing the discharge operation in the duplex mode of the document feeder apparatus according to the present invention;

FIG. 10 is a flow chart showing the discharge operation in the duplex mode of the document feeder apparatus according to the present invention;

FIG. 11 is an explanatory drawing showing an operation of a small size original in the duplex mode of the document feeder apparatus according to the present invention; and FIG. 12 is a sectional view of a document feeder apparatus according to another embodiment of the present invention.

DETAILED DESCRIPTION OF PREFERRED EMBODIMENTS

Figure 1:
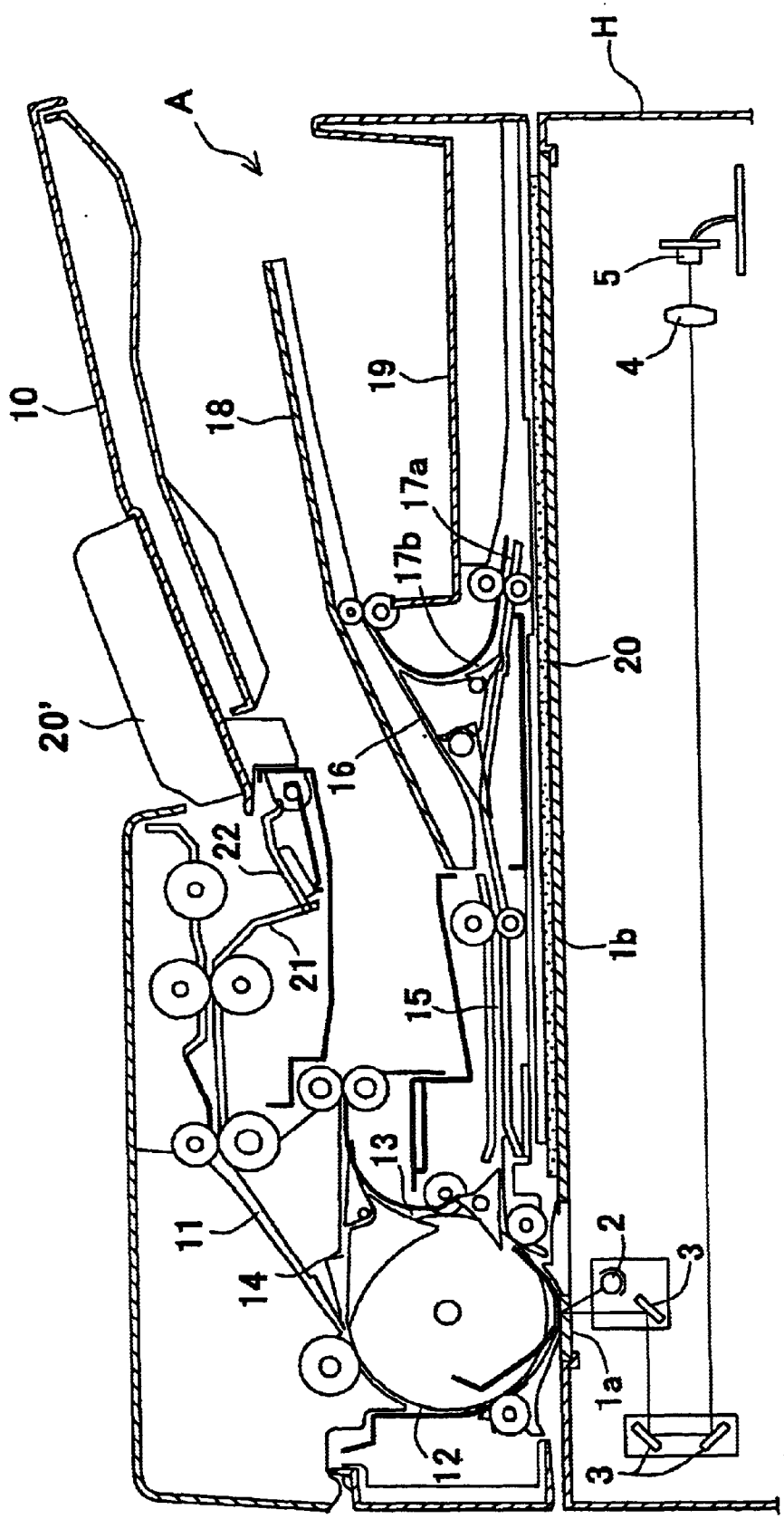
FIG. 1 is a sectional view showing a document feeder apparatus mounted on an image reading apparatus according to an embodiment of the present invention.
Figure 2:
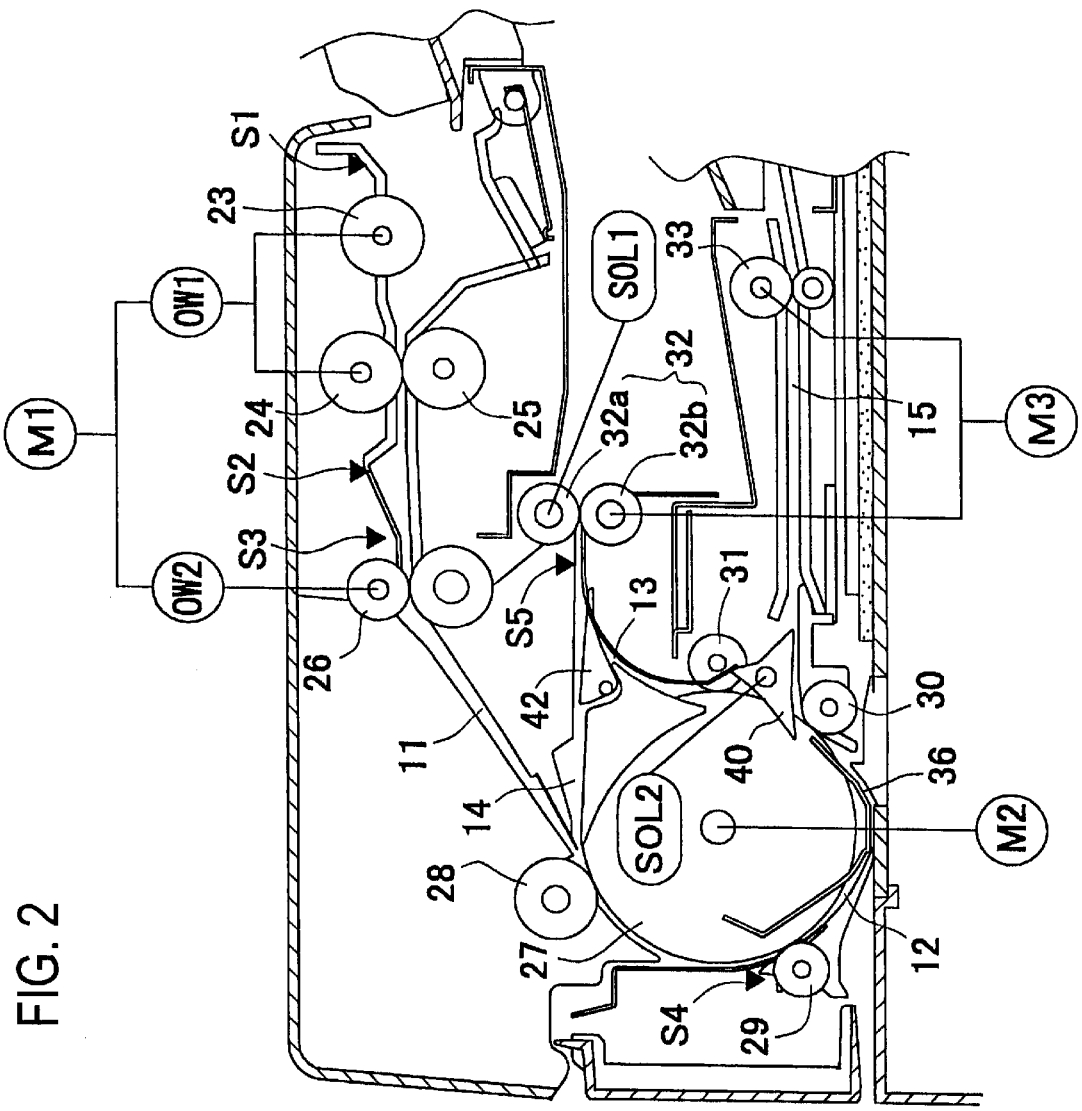
FIG. 2 is a partially expanded sectional view showing the document feeder apparatus shown in FIG. 1.
Figure 3:
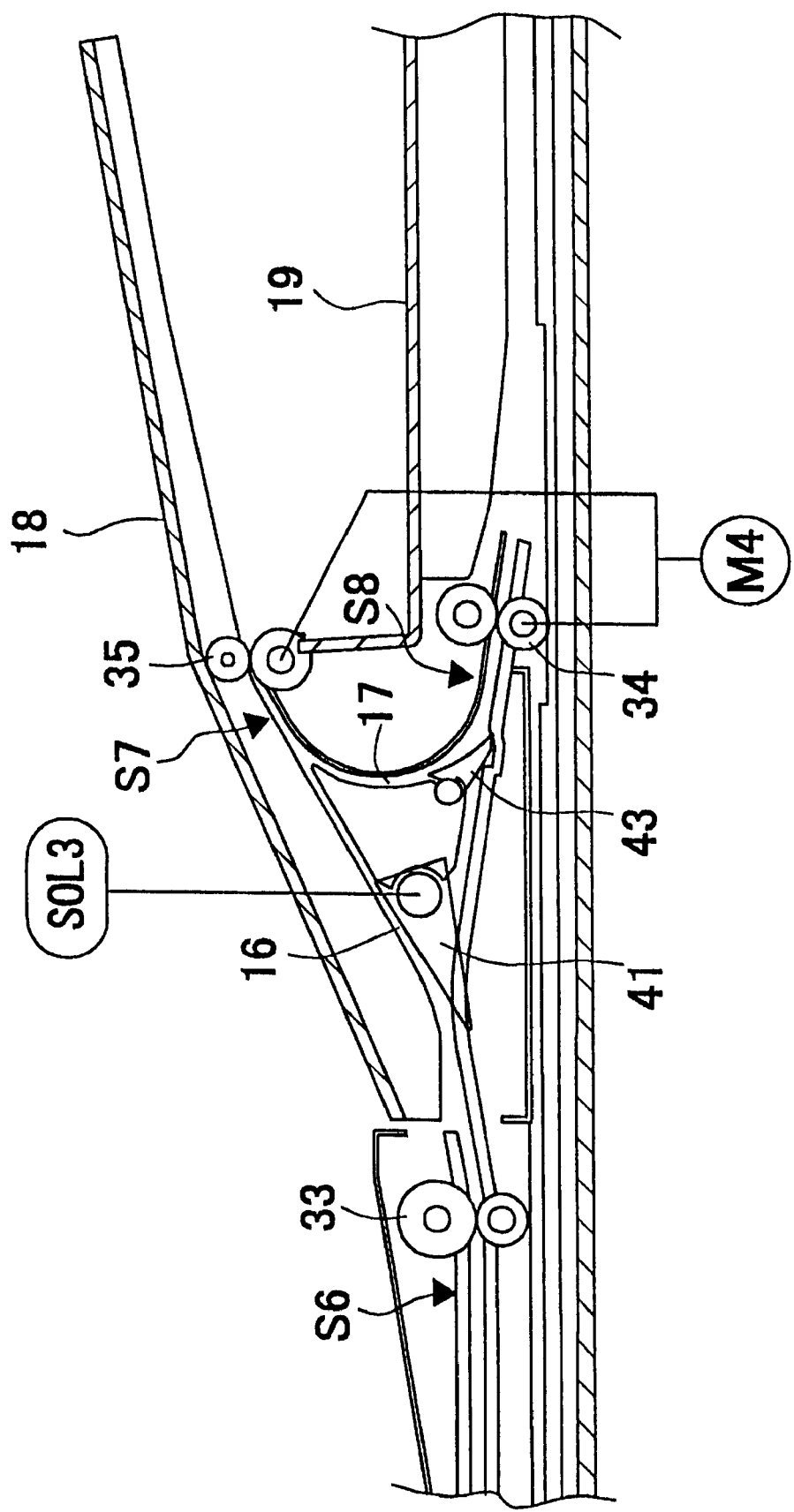
FIG. 3 is a partially enlarged sectional view showing an essential portion of the document feeder apparatus shown in FIG. 1.

Hereunder, embodiments of the present invention will be described in detail with reference to the accompanied drawings. FIG. 1 shows a document feeder apparatus according to the invention, and FIG. 2 and FIG. 3 show essential parts of the document feeder apparatus.

In FIG. 1, A is a document feeder apparatus mounted on an image reading device unit H. The document feeder apparatus A transports an original to pass an upper surface of a contact glass 1a on the apparatus unit H.

In the apparatus unit H, a light source 2, such as a lamp, irradiates light onto the transported original through the first contact glass 1a, and the light reflected by the mirror 3 through a lens 4 is photo-electrically converted by a reading means 5, such as a CCD, to read an image on the original. In other words, the upper surface of the first contact glass 1a comprises the reading portion of the apparatus unit H. The apparatus unit H is also provided with the second contact glass 1b having a surface area capable of placing an original thereupon. With opening and closing the document feeder A, it is possible to read an image on a thick original, such as a book, placed on the second contact glass 1b by moving an optical unit comprising the light source 2 and mirror 3 in the sub-scanning direction to read through the second contact glass 1b.

Next, a structure of the document feeder apparatus A will be explained with reference to FIG. 1 to FIG. 3.

The document feeder apparatus A is equipped with a sheet supply tray 10 as stacking means capable of stacking a plurality of the originals, and the first discharge tray 18 and the second discharge tray 19 as storage means for storing the originals that have been read. The first discharge tray 18 mainly stores large size originals. The second discharge tray 19 stores small size originals. Furthermore, 20 is a pressing cover formed of a porous material member such as a sponge or the like and a film member such as white-colored Mylar to press the second contact glass 1b.

In the document feeder apparatus A, an original supply path comprises an original supply path 11 for supplying the original on the sheet supply tray one at a time toward the first contact glass 1a; a transport path 12 connected to the original supply path 11 for guiding the original to the upper surface of the first contact glass 1a; the first discharge path 13 connected from the transport path 12 to a discharge outlet on the first discharge tray 18; a circulating path 14 connected from a discharge outlet of the first discharge tray 18 to a connecting portion between the original supply path 11 and the transport path 12 for returning the original to the transport path 12; an intermediate path 15 formed to branch with the first discharge path for guiding the original from the transport path 12; the second discharge path 16 connected from the intermediate path 15 to a discharge outlet of the second discharge tray 19; a switchback path 17a formed to branch with the second discharge path 16 for switching back the original from the intermediate path 15; and an inverting path 17b for turning the switched back original over from front to back and for guiding the original into the second discharge tray 19.

A side-guide 20' aligns sides of the original stacked on the sheet supply tray 10, and a stopper 21 aligns a leading edge of the original. Also, the sheet supply tray 10 is rotatably mounted with a leading edge thereof in an original supply direction as a pivot.

To the original supply path 11 are arranged a draw-out roller 23 for drawing out the original; an elevator plate 22 for raising the leading edges of the originals stacked on the sheet supply tray 10 to touch the draw-out roller 23; separating means composed of a sheet supply roller 24 that feeds the original drawn out by the draw-out roller 23 and a separating member 25 that allows only the uppermost original to pass and suppresses the feeding of the second and subsequent originals; and a pair of register rollers 26 for feeding the original downstream after abutting and aligning the leading edge of the original drawn out one at a time and fed by the separating means.

The draw-out roller 23 and the sheet supply roller 24 are interlocked and driven by a sheet supply motor M1 via a one-way clutch OW1, and a pair of the register rollers is interlocked and driven by a sheet supply motor M1 via a one-way clutch OW2. The sheet supply motor M1 rotates forward to drive the draw-out roller 23 and the sheet supply roller 24, and rotates in reverse to drive a pair of the register rollers 26.

To the transport path 12 are arranged a transport roller 27 with a large diameter and a plurality of follower rollers 28, 29 and 30 that are pressed against an outer circumference of the transport roller 27. The transport motor M2 is configured to drive the transport roller 27.

Note that there is a backup guide 36 for regulating a transport gap of the transport path 12 to improve a quality of the original image.

In the first discharge path 13 are arranged a follower roller 31 pressing against the transport roller 27, and a pair of the first discharge rollers 32 for discharging the original to the first discharge tray 18. A reversible drive first discharge motor M3 is linked to a pair of the first discharge rollers 32. In the duplex mode, the first discharge rollers 32 are controlled to rotate in reverse to switchback the original and send it to the transport path 12 via the circulating path 14 while nipping the trailing edge of the original. A pair of the discharge rollers 32 is configured to separate one roller 32a from the other roller 32b through a contact solenoid SOL1, so that the leading and trailing edges of the original circulating through the circulating path 14 and the transport path 12 can be transported without interfering with each other.

In the intermediate path 15 is arranged a pair of intermediate rollers 33 for sending the original downstream. In the second discharge path 16 is arranged a pair of the second discharge rollers 35 for discharging the original to the second discharge tray 19. Also, in the switchback path 17a is arranged a pair of switchback rollers 34 for switching back and sending the original to a pair of the second discharge rollers 35 via the inverting path 17b.

The first discharge motor M3 drives a pair of the intermediate rollers 33, and the reversible second discharge motor M4 drives a pair of the second discharge rollers 35 and a pair of the switchback rollers 34.

Downstream on the transport path 12 is established the first flapper 40 for guiding the original to either the first sheet discharge path 13 or the intermediate path 15. Further downstream of the intermediate path 15 is established the second flapper 41 for guiding the original to either the second discharge path 16 or the switchback path 17a. The first and second flappers are movable by the first solenoid SOL2 and the second solenoid SOL3. Also arranged in the first sheet discharge path 13 and switchback path 17a are flappers 42 and 43 that move upward by the trailing edge of the original for allowing the original to pass through, and move downward under its own weight after the trailing edge of the original passes.

Further, in a downstream side of the sheet supply tray 10 in the original supply direction, an empty sensor S1 is established to detect the original placed on the sheet supply tray 10. Also, to the original supply path 11 are established a length sensor S2 and a register sensor S3 for detecting the edges of the original being fed. Further, in front of the first contact glass 1a is established a read sensor S4; at the discharge outlet of the first discharge tray 18, there is established the first discharge sensor S5; to the intermediate path 15 is established an intermediate sensor S6; near the discharge outlet of the second discharge tray 19 is established the second discharge sensor S7; and to the switchback path 17a is established a switchback sensor S8. These sensors detect the edges of the original that are being fed.

The aforementioned sensors S1 to S8 are connected to control means, including a CPU, for controlling the original transport. Based on output from these sensors, each of the motors M1, M2, M3 and M4 and the solenoids of SOL1, SOL2 and SOL3 are controlled to execute the original transportation.

A plurality of width sensors (not shown in the drawings) is arranged just after a pair of the register rollers 26 with an interval in a direction perpendicular to the original feeding direction. When the original reaches a predetermined position in front of the first contact glass 1a, the CPU recognizes the length of the original according to an output signal from the register sensor S2, and recognizes the width of the original according to output signals from a plurality of width sensors. Thus, the length and the width of the original that are recognized determine the size of the original.

Here, a plurality of the width sensors is established, and the output signals thereof are used to detect the width direction of the original. However, it is also perfectly acceptable to use a volume whose output varies according to an amount of movement of the side guide mounted on the sheet supply tray to determine the width of the original. Also, it is also possible to determine the length of the original based on an output from a plurality of sensors arranged on the sheet supply tray, rather than based on the output signal from the length sensor S2.

The following will describe an original feeding operation of the document feeder apparatus according to the aforementioned configuration.

Firstly, to explain the single-side mode for reading one side of the original, it is determined whether the empty sensor S1 is ON, in other words, the originals are stacked on the sheet supply tray 10. Then, when a sheet supply instruction from the main unit H is received, the paper feed motor M1 is driven in the forward direction to feed the original. At this time, while the draw-out roller 23 and feed roller 24 are rotated in the sheet feeding direction, a pair of the register rollers 26 does not rotate due to an action of the one-way clutch OW2. When the register sensor S3 detects the leading edge of the original being fed, the paper feed motor M1 stops temporarily after the original is transported by a predetermined amount after the detection. At this time, the leading edge of the original touches a nip of the register rollers 26, and forms a bend thereby aligning the leading edge of the original and eliminating skew. Then, after the temporary stopping, the paper feed motor M1 is driven in reverse rotation to feed the original from the original supply path 11 to the transport path 12.

The transport motor M2 starts to rotate at the same time when the sheet supply motor M1 is driven in reverse, thus the original is transported through the original supply path 11 along the transport roller 27. Also, when the leading edge of the original being transported through the transport path 12 is detected, the sheet supply motor M1 and the transport motor M2 stop after transporting the original by a predetermined amount after the detection. At this point, the original stops at a position in front of the first contact glass 1a. Then, when a read transport signal from the main unit H is received, the transport motor M2 is driven again to pass the original over the first contact glass 1a. At that point, the reading means reads the image on the original.

In the process of transporting the original over the first contact glass 1a, after the original is transported by a predetermined amount after the read sensor detects the leading edge of the original being fed, the sheet supply motor M1 and the transport motor M2 are stopped. At this point, the leading edge of the original reaches a position in front of the first contact glass 1a, and through the output signal from the length sensor S2, the subsequent original feed operation is selected.

In a case that an output signal of the length sensor S2 is ON, in other words, the original is positioned at the length sensor S2 position, the original is recognized to be a long size (an original longer than a predetermined length), and is controlled to discharge to the first discharge tray 18. In other words, when the original is recognized to be a long size, the first solenoid is excited to move the first flapper 40 to a position to guide the original into the first discharge tray 18, as shown in FIG. 4(a), while the first sheet discharge motor M3 is driven forward to rotate a pair of the first discharge rollers 32 in the forward direction. The original, then, is passed over the first contact glass 1a by the transport roller 27, as shown in the FIG. 4(a), and is subsequently discharged to the first discharge tray 18 along the first discharge path 13. Then, after a predetermined amount of time after the first sheet discharge sensor S5 detects the trailing edge of the original, it is determined whether the entire original has been discharged to the first discharge tray 18.

In a case that an output signal of the length sensor S2 is OFF, in other words, the original is not positioned at the length sensor S2 position, the original is recognized to be a short size (an original shorter than a predetermined length), and the first flapper 40 maintains its normal position, as shown in FIG. 4(b), while the first sheet discharge motor M3 is driven forward to rotate the intermediate roller 33. The original that passes over the first contact glass 1a, as shown in FIG. 4(b), is guided to the intermediate path 15 and is discharged to the second discharge tray 19 by the intermediate roller 33 and a pair of the second discharge rollers 35 via the second sheet discharge path 16.

At this point, when the intermediate sensor S6 detects the leading edge of the original being transported through the intermediate path 15, the second sheet discharge motor M4 is driven forward to control the rotation of a pair of the second sheet discharge rollers 35. Then, after a predetermined amount of time after the second sheet discharge sensor S8 detects the trailing edge of the original, it is recognized that the entire original has been discharged to the second discharge tray 19.

Note that in the single side mode, in the process of transporting the original through the transport path 12, when the register sensor S5 detects the trailing edge of the original, it is verified that the original is on the sheet supply tray 15. If there is another original, it is controlled to start the original feeding operation in the same manner as performed for the previous original.

Next, to describe the duplex mode or the double-sided original mode, wherein the both sides of the original are read, the elevator plate 22 is raised, and the draw-out roller 23 and sheet supply roller 24 are driven to drawn out the original. After the leading edge of the original abuts a pair of the register rollers 26 to remove any skew, a pair of the register rollers 26 and the transport roller 27 are driven to send the original from the original supply path 11 to the transport path 12. After the read sensor S4 detects the leading edge of the original, the original is stopped at a position in front of the contact glass 1b after the original is transported by a predetermined amount.

The operation of supplying and transporting the Original from the sheet supply tray 10 to the position in front of the first contact glass 1a is the same as described for the single side mode.

Also, when the leading edge of the original reaches the position in front of the first contact glass 1a, the length of the original is recognized based on an output signal of the length sensor S2 in the same manner as described for the single side mode, but in this case, the length that is recognized is stored in RAM in the CPU.

In the duplex mode, regardless of the length of the original, the first solenoid is excited to move the first flapper to a position to guide all originals into the first discharge path 13, as shown in FIG. 5. Then, when the read transport signal from the main unit H is received, the transport motor M2 is driven again and the first sheet discharge motor M3 is driven forward. Through this process, the reading means reads a surface of the original as the original passes over the first contact glass 1a, and the original is guided into the first sheet discharge path 13.

The original guided into the first sheet discharge path 13 is transported into the discharge tray 18 as the leading edge of the original lifts the third flapper 42 arranged to cover the discharge path 13. Then, when the first discharge sensor S5 detects the trailing edge of the original, the first sheet discharge motor M3 and the transport motor M2 are stopped. At this time, the leading edge side of the original is exposed on the first discharge tray 18, while a pair of the discharge rollers 32 nips the trailing edge of the original. Then, the first sheet discharge motor M3 is driven in reverse to rotate a pair of the first sheet discharge rollers 32, so that the original is switched back and guided into the circulating path 14 along an original guide surface of the third flapper 42. In other words, in the process of switching back and guiding the original into the circulating path 14, a space between the sheet supply tray 10 and the discharge tray 18 functions as a switchback path to switch back the original.

After the first discharge sensor S5 detects the leading edge of the original switched back at a pair of the first sheet discharge rollers 32, the original is transported by a determined amount so that the leading edge of the original abuts against the nipping portion of the transport roller 27 and the follower roller 28 pressing thereto, which are in an idle state, to form a bend and remove any skew.

Then, the transport motor M2 is driven to rotate the transport roller 27 to feed the original again. The original is transported along the transport roller 27. When the read sensor S6 detects the leading edge of the original, the transport motor M2 stops after a predetermined amount of time.

Specifically, as shown by a solid line in FIG. 5, the original, whose leading edge side is sent to the first discharge tray 18, is returned to the transport path 12 via the circulating path 14 by the first discharge roller 32.

When the leading edge of the original reaches the position in front of the first contact glass 1a, the first flapper 40 is controlled to switch a transport path for guiding the original according to the length thereof previously recognized, and discharges the original in a different manner.

Specifically, when the original is a long size, the first flapper 40 will be positioned to guide the original into the first discharge path 13. Then, the original is inverted and discharged via the first contact glass 1a again to change page order, as shown by dotted lines in FIG. 5.

When the size of the original is short, the first flapper 40 is released from an excited state, and moves to a position to guide the original to the intermediate path 15. The original is guided from the intermediate path 15 into the switchback path 17a, as shown in FIG. 1. After switched back in the switchback path 17a, the original is inverted in the inverting path 17b and discharged.

The following describes a discharge operation according to the length of the original with reference to the flow charts in FIG. 6 to FIG. 10.

In an operation of discharging a long-sized original, the original is stopped in front of the first contact glass 1a, and at the same time the pressing solenoid SOL1 is excited to separate a pair of the first discharge rollers 32. The first solenoid SOL2 is excited to move the first flapper into a position to guide the original into the first discharge path 13. (Step 10 to Step 11)

Then, when the read transport instruction from the main unit H is received, the transport motor M2 is driven again to send the original into the first discharge path 13, while the reading means reads the backside of the original on the first contact glass 1a.

Here, the leading edge of the original sent to the first discharge path 13 after passing over the first contact glass 1a crosses the trailing edge of the original being re-supplied at the first paired discharge rollers 32. The original is transported without hindrance as a pair of the first discharge rollers 32 is in a separated state.

Then, when the read sensor S4 detects the trailing edge of the original, the first discharge motor M3 is driven forward while the pressing solenoid SOL1 is released from an excited state to press a pair of the first discharge rollers 32 together (step 14 to step 16). Through this process, a pair of the first discharge rollers 32 pressing together feeds the original. When the first discharge sensor S5 detects the trailing edge of the original, the first discharge motor M3 is stopped, and the original is stopped with the trailing edge thereof being nipped by a pair of the first discharge rollers 32 (step 17 to step 18).

Then, to change the page order of the originals and to discharge them to the first discharge tray 18, the first discharge motor M3 is driven to rotate in reverse to switch back the original, and transport the same to the transport path via the circulating path 14 (Step 19). When the read sensor S4 detects the original being transported through the transport path 12, the pressing solenoid is excited. While a pair of the first discharge rollers 32 is separated, the first discharge motor M3 stops (step 20 to step 22). The original is then transported to a top of the contact glass 2. However, since the original is not going to be scanned or read at this point, the original does not need to stop in front of the contact glass 2, so the original is transported to the first discharge path 13. Then, when the read sensor S4 detects the trailing edge of the original, the first discharge motor M3 is driven to rotate forward while the pressing solenoid SOL1 is released from the excited state to press a pair of the first discharge rollers 32 together (step 23 to step 25) Then, after a predetermined amount of time after the first sheet discharge sensor S5 detects the trailing edge of the original, it is determined whether the entire original is discharged to the first discharge tray 18 (step 26 to step 27) and all motors stop.

Note that in the process of transporting the original from the sheet supply tray 10 through the transport path 12, when the length sensor S5 detects the trailing edge thereof, it is verified whether the original is on the sheet supply tray 10. If there is another original, the apparatus starts the original feeding operation for the next original in the same manner as performed for the previous one. Also, the original abuts against a pair of the register rollers 26 to remove any skew, and stays idle. After reading the back and front sides of the original, when the read sensor S4 detects the trailing edge of the original passing over the first contact glass 1a for changing the page order, the sheet supply motor M1 is driven in reverse to send the original, which is in an idle state, to the transport path 12.

In the operation of transporting the long size original in the duplex mode, it is configured to switch back the long size original using the wide space between the sheet supply tray and the discharge tray. Thus, it is possible to securely send the original without hindrance, even if the original has a folded portion, a curl or punched holes. Also, because the space for switching back the original does not need to have a length longer than the maximum original length, the apparatus can be made compact, and it is possible to read both sides of the long size original.

Next, in the case of the short size original, the first solenoid SOL2 is released from the excited state to move the first flapper 40 to a position to guide the original into the intermediate path 15. Then, when the read transport instruction is received from the main unit H, the transport motor M2 is driven again and the first discharge motor M3 is driven to rotate forward so that the reading means reads the backside of the original on the first contact glass 1a (step 31 to step 33) Through this process, the original passed over the first contact glass 1a by the transport roller 27 is guided into the intermediate path 15 and is fed by a pair of the intermediate rollers 33.

When the intermediate sensor S6 detects the leading edge of the original traveling along the intermediate path 15, the second solenoid SOL3 is excited to move the second flapper 41 from a normal position to a position to guide the original into the switchback path 17a, while the second discharge motor M4 is driven to rotate in reverse (step 34 to step 36).

After being guided into the switchback path 17a by the second flapper 41, the original passes as the leading edge lifts the fourth flapper upward. Then, when the switchback sensor S8 detects the trailing edge of the original, the second discharge motor M4 stops (step 37 to step 38). At this time, the trailing edge of the original is nipped at a pair of the switchback rollers 34. Then, the second discharge motor M4 is driven to rotate forward to switch back the original and return the original in the switchback path 17a (step 39). The original sent in reverse is guided into the inverting path 17b along the guide surface of the fourth flapper 43, which is hanging downward to block the path. Then, the original is inverted front to back and discharged to the second discharge tray 19 by a pair of the second discharge rollers 35.

Then, after a predetermined amount of time after the second sheet discharge sensor S7 detects the trailing edge of the original discharged by a pair of the second discharge rollers 35, it is determined that the entire original has been discharged to the second discharge tray 19 (step 40 to step 41).

Note that in the process of transporting the original from the sheet supply tray 10 through the transport path 12, when the length sensor S5 detects the trailing edge thereof, it is verified whether the original is on the sheet supply tray 10. If there is another original, the apparatus starts the original feeding operation for the next original in the same manner as performed for the previous one. Also, the original abuts against a pair of the register rollers 26 to remove any skew, and stays idle. In the process of transporting the original, whose surface is read, in the transport path 12 through the circulating path 14 after being switched back by a pair of the first discharge rollers 32, after the read sensor S4 detects the trailing edge of the original with the surface being read, the sheet supply motor M1 is driven in reverse to send the next original, which is in an idle state, to the transport path 12 after a lapse of a predetermined period of time.

In the operation of feeding the short size original in the duplex mode, it is configured to have two paths separately, a path for switching back and inverting the original to be resent to the contact glass for reading the both sides and a path for switching back and discharging the original to change the page order. Thus, a speed of processing both sides of the most commonly used small size papers A4 and B5 can be faster, and productivity is improved.

That is, according to the aforementioned embodiment, at the point when the leading edge of the original reaches the predetermined position, the length of the original is determined with a CPU program based on the original detection signal from the sensor arranged upstream of the predetermined position. According to the recognized original length, the CPU program selects one of the two switchback paths; the switchback path (the first switchback path) that uses the space formed between the sheet supply tray and the discharge tray, and the switchback path (the second switchback path) established below the two discharge trays. Then, the control means including the CPU controls to move the flapper (the guiding means) to the position to guide the original into the selected one of the switchback paths, so the speed of processing both sides of the most commonly used small size papers A4 and B5 can be faster, and productivity is improved.

Also, according to the embodiment mentioned above, the separate tray for storing mainly the large size sheets and the tray for storing small size sheets are provided separately. In addition, the trays are arranged on the side of the document feeder apparatus storing the small size sheets in the original discharge direction. Thus, it is possible to verify the state of discharging the small size original even if the sheet supply tray is arranged at an upper portion, and further it is easy to remove.

In the embodiments of the present invention described above, it is configured to discharge the large and small size originals to the different trays. However, as shown in FIG. 12, it is also perfectly acceptable to discharge them to one discharge tray.

In another embodiment, the operations of supplying, transporting and discharging the large size original are the same as the embodiment described above. In the single side mode for small size original, a switching flapper 50, which is equivalent to the first flapper 40, moves to a position to guide the original to the discharge path 51, which is equivalent to the first discharge path 13, guides originals into the discharge path 51. The reversible drive motor M10 is driven to rotate forward to rotate the drive roller 55 in the sheet discharge direction to discharge the original to the discharge tray 52.

Also, in the duplex mode for the small size original, the switching flapper 50 moves to a position to guide the original into the switchback inverting discharge path 52, and guides the original with the both sides read into the switchback inverting discharge path 52. Then, immediately after the trailing edge of the original passes the switching flapper 50, the switching flapper 50 moves to a position to guide the original into the discharge path 51. Through this process, the next original to be sent by passing the first contact glass 1a is guided into the discharge path 51. Then, when a sensor S20 arranged in the switchback inverting discharge path 52 detects the trailing edge of the previous original fed to the switchback inverting discharge path 52, a solenoid clutch CL interrupts the drive to the inverting roller 53 to stop the original. At this time, the previous original is idled inside of the switchback inverting discharge path 52. Then, when the sensor S21 arranged at the discharge path 51 detects the trailing edge of the next original guided into the discharge path 51, the reversible motor M10 is driven to rotate in reverse, and the solenoid clutch CL transmits the drive from the reversible motor M10 to the inverting roller 53. Through this process, the next original is switched back, and guided back to the contact glass 1b, while the previous original is discharged to the discharge tray 52.

According to this another embodiment of the invention, it is possible to transport the short original efficiently without using the drive source like a plurality of motors or solenoids, so a cost can be further reduced and the original feeding control can be further simplified.

Also, according to the embodiment, the recognition means for recognizing the length of the original is constituted of an original detection output signal at the point the leading edge of the original of the sensor (length sensor S2) established in the original supply path reaches a determined position, and the CPU for determining the size of the original based on the output signal. However, it is also possible to configure so that the CPU recognizes the length of the original using original length information transmitted from an external apparatus such as an original reading apparatus or a personal computer, or using information obtained from a plurality of sensors placed on the sheet supply tray for detecting the size of the original.

What is claimed is:

1. A document feeder apparatus for sequentially transporting an original to a predetermined reading position and discharging the original read at the reading position, comprising:

stacking means for stacking the original, a supply path for guiding the original on the stacking means toward the reading position, a transport path connected to the supply path for guiding the original to the reading position, storage means for storing the original read at the reading position, a discharge path for guiding the original read at the reading position to the storage means, a plurality of switchback paths disposed at downstream of the reading position, each of the plurality of the switchback paths reversing front-rear sides of a transport direction of the original read at the reading position and transferring the original, recognition means for recognizing a length of the original guided to the reading position, selection means for selecting one of a plurality of the switchback paths according to the length of the original recognized by the recognition means, and guide means for guiding the original read at the reading position to one of the plurality of the switchback paths selected by the selection means.

2. A document feeder apparatus according to claim 1, wherein the plurality of the switchback paths comprises a first switchback path having a portion disposed in a space between the stacking means and the storage means stacked with each other, and a second switchback path arranged under the storage means.

3. A document feeder apparatus according to claim 2, wherein said selection means selects the first switchback path when the recognition means recognizes the original guided to the reading position to have a length longer than a predetermined length, and selects the second switchback path when the recognition means recognizes the original guided to the reading position to have a length shorter than the predetermined length.

4. A document feeder apparatus according to claim 1, wherein said recognition means comprises original detection means arranged on the supply path, and recognizes the length of the original based on a result detected by the original detection means when a leading edge of the original reaches a predetermined position established at downstream of the original detection means.

5. A document feeder apparatus according to claim 2, wherein said second switchback path has an outlet separate from the discharge path and extending to the storage means so that the original transferred to the second switchback path is changed in its direction and directly transferred to the storage means.

6. A document feeder apparatus for sequentially transporting an original to a predetermined reading position and discharging the original read at the reading position, comprising:

stacking means for stacking the original, a supply path for guiding the original on the stacking means toward the reading position, a transport path connected to the supply path for guiding the original to the reading position, storage means disposed under the stacking means for storing the original read at the reading position, a discharge path for guiding the original read at the reading position to the storage means, a first switchback path having a portion disposed in a space between the stacking means and the storage means stacked with each other, a first inverting discharge path connected to the first switchback path for turning over a front side to a back side of the original from the first switchback path, a second switchback path arranged under the storage means, a second inverting discharge path connected to the second switchback path and formed separately from the discharge path, said inverse path turning over a front side to a back side of the original introduced into the second switchback path and leading the original to the storage means, recognition means for recognizing a length of the original guided to the reading position, selecting means for selecting one of the first and the second switchback paths according to the length of the original recognized by the recognition means, and guiding means for guiding the original to one of the first and the second switchback paths selected by the selecting means.

7. A document feeder apparatus according to claim 6, wherein said first inverting discharge path is composed of the transport path for guiding the original to the reading position, a circulating path for guiding the original switched back by the first switchback path to the transport path, and the discharge path for guiding the original from the reading position to the storage means.

8. A document feeder apparatus according to claim 6, further comprising control means for executing a transport operation for supplying the original to the reading position through the supply path to read one side of the original, and for executing a re-supply operation for supplying the original with the one side thereof read at the reading position again to read the other side of the original, said selection means selecting one of a plurality of the switchback paths according to the transport operation executed by the control means.

9. A document feeder apparatus according to claim 6, wherein said second inverting discharge path has an outlet separate from the discharge path and extending to the storage means so that the original transferred to the second inverting discharge path is changed in its direction and directly transferred to the storage means.

10. A document feeder apparatus according to claim 8, wherein said control means controls sheet discharge operations such that after the original introduced into the first switchback path by the guiding means is switched in its transfer direction and is transferred, the original is transferred to the storage means through the first inverting discharge path, and after the original introduced into the second switchback path by the guiding means is switched in its transfer direction and is transferred, the original is transferred to the storage means through the second inverting discharge path.

11. An image reading apparatus provided with a document feeder apparatus that supplies an original to a platen for reading the original and discharges the original read on the platen, comprising:

stacking means for stacking the original, supply means for guiding the original on the stacking means toward a reading position, transport means for guiding the original to the platen, storage means for storing the original read on the platen, discharge means for guiding the original read on the platen to the storage means, a plurality of switchback means disposed in a space between the platen and the stacking means, each of the plurality of the switchback means reversing front-rear sides of a transport direction of the original read at the reading position and transferring the original, reading means disposed under the platen for reading the original supplied to the platen, recognition means for recognizing a length of the original transported to the platen, selection means for selecting one of the plurality of the switchback means according to the length of the original recognized by the recognition means, and guide means for guiding the original read at the reading position to one of the plurality of the switchback means selected by the selection means.

12. An image reading apparatus according to claim 11, wherein the plurality of the switchback means comprises first switchback means disposed between the stacking means and the storage means stacked with each other, and second switchback means disposed between the storage means and the platen.

13. An image reading apparatus according to claim 11, wherein said reading means is stationary to read the original passing over the platen, and moves to read the original placed on the platen.

14. An image reading apparatus according to claim 12, wherein said second switchback means has an outlet separate from the discharge means and extending to the storage means so that the original transferred to the second switchback means is changed in its direction and directly transferred to the storage means.

\* \* \* \* \*